United States Patent Office 3,219,608
Patented Nov. 23, 1965

3,219,608
EMULSION POLYMERIZATION OF VINYL ACETATE USING ALLYL SULPHOSUCCINATES AS POLYMERIZABLE EMULSIFIERS
Richard F. J. Ingleby, 52 Ram Gorse, Harlow, England, and Basil A. Ripley-Duggan, 51 Vantorts Road, Sawbridgeworth, England
No Drawing. Filed Nov. 14, 1960, Ser. No. 68,649
Claims priority, application Great Britain, Nov. 16, 1959, 38,845/59
18 Claims. (Cl. 260—29.6)

This invention relates to a process for preparing aqueous emulsions of polyvinyl acetate or of vinyl acetate copolymers.

Emulsions of polyvinyl acetate or of vinyl acetate copolymers are commonly produced on a large scale by polymerising the monomer or mixture of monomers in aqueous dispersions containing free-radical initiators, interfacial tension depressants and water-soluble polymeric substances, together with various other ingredients necessary to impart desired properties to the emulsion and to the dispersed resin. The dispersion is agitated during the polymerisation process, which is usually effected at an elevated temperature.

The presence of a water-soluble interfacial tension depressant (referred to hereinafter as a "surfactant") and of a water-soluble polymeric substance (referred to hereinafter as a "colloid stabiliser") are usually essential to secure stable fine-particled emulsions free of aggregated particles. When thin layers of such emulsions are allowed to dry, the dried films of resin contain these water-soluble materials, a fact which renders the films more water-sensitive than they would be if such water-soluble materials were absent, notwithstanding the possibility that the latter substances may be modified to some extent during the polymerisation process by, for example, graft copolymerisation.

Further, it is likely that the colloid stabiliser interferes with, and reduces the rate of, the process of film integration, i.e. the coalescence over a period of time of the particles of the dispersion to form a film, when the emulsion is allowed to dry in a thin layer.

It has been proposed to prepare emulsions of polyvinyl acetate and of vinyl acetate copolymers in the absence of surfactants and of colloid stabilisers by carrying out polymerisation in the presence of small proportions of vinyl sulphonic acid or of salts thereof (see, for example, Schildknecht: "Vinyl and Related Polymers," page 646; F.I.A.T. Report No. 1102; U.S. Patent 2,300,920) or, in a similar manner, allyl and methallyl sulphonic acids and of salts thereof (see U.S. Patent 2,859,191). As a result of such procedures it is possible to secure exceedingly fine-particled emulsions which deposit clear, highly water-resistant films when dried in thin layers. Such products are extremely desirable in many applications of polyvinyl acetate emulsions or of vinyl acetate copolymer emulsions.

Sodium vinyl sulphonate is not an inexpensive or conveniently accessible substance, being prepared by dehydrohalogenation of the sodium salts of haloethane sulphonic acids or by reaction between sodium ethionate and sodium hydroxide. While sodium allyl sulphonate is more readily prepared, we have found that emulsions prepared with the aid of this substance suffer from the defect that they possess an obnoxious odour, possibly of acrolein generated during the polymerisation process. Further, a strong pink colouration develops when the emulsion is dried in a thin layer at an elevated temperature.

It is an object of the present invention to overcome these disadvantages.

According to the invention there is provided a process for preparing an aqueous emulsion of polyvinyl acetate or a vinyl acetate copolymer, wherein vinyl acetate or a mixture of monomers containing vinyl acetate is polymerised in an aqueous dispersion to which has been added a substance or substances capable, when dissolved in water, of producing an anion having the following formula:

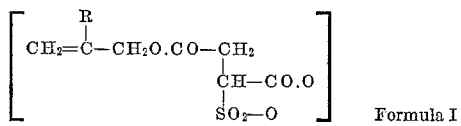

Formula I where R is a hydrogen atom or methyl radical.

The cations of the above-mentioned substance may be the same or different, and may be hydrogen ions, alkali metal ions, ammonium radical ions, or substituted ammonium radical ions derived from organic amines.

It is preferred to employ the monoallyl ester of disodium or diammonium sulphosuccinate, which, in the unionised form, is represented by the following formula:

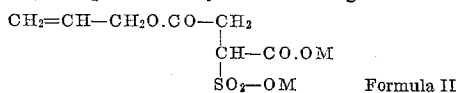

Formula II where M is Na or $NH_4$.

These substances are very conveniently prepared in good yield by reacting monoallyl hydrogen maleate with sodium or ammonium sulphite respectively. The substances need not be isolated, since they may be prepared and used in aqueous solution, providing the anion represented by Formula I together with two sodium or ammonium ions.

Substances providing other cations and anions may be present during polymerisation.

The process of preparing emulsions of polyvinyl acetate or of vinyl acetate copolymers using the monoallyl ester of disodium sulphosuccinate is conducted in a manner analogous to processes in which sodium vinyl sulphonate or sodium allyl sulphonate are used. Essentially, the monomer is polymerised in an aqueous dispersion containing the monoallyl ester of disodium sulphosuccinate in a proportion between 0.02% and 5% of the total weight of monomers. A free-radical initiator is present, the dispersion is agitated and polymerisation carried out at an elevated temperature. It is usually found desirable to maintain the concentration of monomer in the aqueous dispersion at a low level throughout the polymerisation, the monomer being added either in portions or continuously during the process until the desired resin concentration has been achieved.

In a preferred method of carrying out the process a proportion of the monoallyl ester of disodium sulphosuccinate amounting to between 0.1 and 1% of the weight of monomer to be polymerised is dissolved in water together with a free-radical initiator which may be a salt of persulphuric acid, such as potassium persulphate or ammonium persulphate. Heat is applied, and vinyl acetate or a mixture of monomers containing vinyl acetate is added continuously to the stirred aqueous solution. The temperature of the reaction mixture and the rate of addition of monomer are so adjusted as to maintain a very small rate of reflux of condensing vapours. The addition of monomer is stopped when the emulsion contains the required concentration of polymer. After cooling, an exceedingly fine-particled mobile emulsion is obtained, having little odour and drying at elevated temperatures to light-coloured films.

In alternating procedures, the monoallyl ester of disodium sulphosuccinate may be added either in portions during the polymerisation or continuously. Further, small proportions of surfactants and of colloid stabilisers may also be present during the process in order to promote extra stability and absence of aggregates. These proportions will normally be much smaller than those employed in the conventional emulsion polymerisation of vinyl acetate, in order that the formation of very fine particles and the water resistance of the dried film is not impaired. These proportions of surfactant and colloid stabiliser will not suffice to produce a stable emulsion in the absence of the monoallyl ester of disodium sulphosuccinate.

Examples of comonomers which may be used together with vinyl acetate in the present process are: alkyl esters of maleic, fumaric, itaconic and acrylic acids; vinyl esters of organic carboxylic acids having a molecular weight higher than acetic acid, such as vinyl propionate, vinyl stearate, vinyl crotonate, vinyl benzoate; isopropenyl esters of acetic acid and of organic carboxylic acids having a molecular weight higher than acetic acid; vinyl chloride; vinylidene chloride; crotonic, itaconic and acrylic acids; acrylonitrile.

The proportion of comonomer to be used with the vinyl acetate will not normally exceed 50% by weight of the total weight of monomers.

Other materials often employed in processes for preparing polyvinyl acetate and vinyl acetate copolymer emulsions may also be present, examples of these being chain transfer agents; solvents; plasticisers; pH adjusters; and neutral salts.

The invention is illustrated by the following examples:

EXAMPLE 1

*Preparation of disodium allyl sulphosuccinate*

100 grams of maleic anhydride were heated to 85° C. in a flask fitted with an internal thermometer, a stirrer and a reflux condenser. Over a period of 1 hour, 60 grams of allyl alcohol were added dropwise. The mixture was maintained at 85° C. without stirring for a further 2½ hours. The hot mixture was then added over a period of 25 minutes to a filtered solution of 264 grams sodium sulphite heptahydrate dissolved in 360 ccs. of water at 75–90° C. Part of the water was removed at reduced pressure from the clear solution thus obtained in order to eliminate traces of allyl alcohol and sulphur dioxide. After dilution with water to a total weight of 1 kilogram, the solution was suitable for use as a stock solution of disodium allyl sulphosuccinate and portions could be used in the process of the invention. Alternatively, the solid residue produced on complete removal of the water by evaporation at reduced pressure could be recrystallised from a methanol/water mixture to give white flaky crystals, which were very soluble in water but which were insoluble in methanol. The solid product was non-hygroscopic and decomposed at about 312° C.

EXAMPLE 2

*Preparation of diammonium allyl sulphosuccinate*

An aqueous solution of diammonium allyl sulphosuccinate was made following the procedure described in Example 1, with the exception that 134 grams of ammonium sulphite monohydrate were substituted for the sodium sulphite heptahydrate used there. A slight excess of ammonium sulphite may with advantage be employed, the excess being removed together with any free allyl alcohol by taking off part of the water at somewhat reduced pressure. A 1.5 molar solution of diammonium allyl sulphosuccinate does not crystallise out at room temperature, and forms a convenient stock solution.

EXAMPLE 3

450 grams of vinyl acetate containing 0.9 gram of carbon tetrachloride were added to a stirred solution of 2 grams of disodium allyl sulphosuccinate, 1.2 grams of potassium persulphate and 2 grams of polyvinyl alcohol sold under the registered trademark "Alcotx 99/20," all dissolved in 550 grams of water, the whole mixture being stirred and surrounded by a bath at a temperature of 80° C. The vinyl acetate was added at such a rate that the reflux temperature did not fall below 80° C. After all the vinyl acetate had been added the emulsion was cooled. A fine-particled dispersion containing little coagulum and having a solids content of 43.4% w./w. was obtained.

EXAMPLE 4

The procedure described in Example 3 was repeated using 450 grams of vinyl acetate containing 50 grams of acetyl tributyl citrate, 2 grams of disodium allyl sulphosuccinate, 1.2 grams of potassium persulphate and 500 grams of water. An exceedingly fine-particled emulsion having a total solids content of 50.7% was obtained.

EXAMPLE 5

The procedure described in Example 3 was repeated using a mixture of 405 grams of vinyl acetate and 45 grams of butyl acrylate, 1.8 grams of disodium allyl sulphosuccinate, 1.08 grams of potassium persulphate and 550 grams of water. A fine-particled mobile emulsion containing only a small amount of coagulum was obtained after cooling.

EXAMPLE 6

A mixture of 145 parts water, 2 parts tributyl acetyl citrate as a plasticiser, and 2.5 parts of a 20% w./w. solution of sodium dodecyl benzene sulphonate were stirred and heated to 84° C., when 4 parts of a molar solution of diammonium allyl sulphosuccinate and 0.5 part of ammonium persulphate were added. 190 parts of vinyl acetate were then added over a period of 90 minutes with vigorous agitation, the vapour temperature being kept in the range of 80 to 85° C. The vapour temperature was finally brought to 88 to 90° C. for 15 minutes, and the emulsion was then cooled. A very fine particled stable emulsion, free from coagulum or flocculated matter, was obtained.

The emulsion was yellow-orange in colour when viewed by transmitted light and showed thixotropic behaviour. Integrated films could be cast from it at room temperature. These films had an excellent gloss, and showed extremely high resistance to water spotting.

The emulsion could be plasticised with tributyl acetyl citrate to give a thick yellow-orange emulsion of about 60% total solids (resins+plasticiser).

The use of a small amount of dispersed plasticiser (or almost any water insoluble liquid) in the initial mix to which the vinyl acetate is slowly added, surprisingly helps to prevent the appearance of coagulum traces in the early stages of the polymerisation.

Having thus described the invention, what is claimed as new and desired to be secured by Letters Patent is:

1. A process for preparing an aqueous emulsion of a vinyl acetate polymer, comprising the step of polymerising a monomeric material comprising vinyl acetate and an anion having the formula:

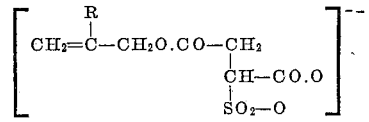

in which R is selected from the group consisting of a hydrogen atom and a methyl radical.

2. The process of claim 1, wherein the cations associated with said anion are selected from the group consisting of hydrogen ions, alkali metal ions, ammonium radical ions, and substituted ammonium radical ions derived from organic amines.

3. The process of claim 1, wherein the source of said anion is the monoallyl ester of disodium sulphosuccinate.

4. The process of claim 1, wherein the source of said anion is the monoallyl ester of diammonium sulphosuccinate.

5. A process for preparing an aqueous emulsion of a vinyl acetate polymer, comprising the steps of polymersing a monomeric material comprising vinyl acetate in the presence of a free-radical initiator and a compound having the formula:

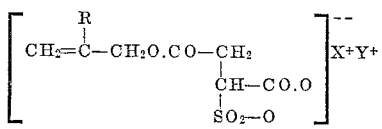

wherein R is selected from the group consisting of a hydrogen atom and a methyl radical and of which X and Y are selected from the group consisting of hydrogen ions, alkali metal ions, ammonium radical ions and substituted ammonium radical ions derived from organic amines, and agitating said dispersion at an elevated temperature.

6. The process of claim 5, wherein the free-radical initiator is a salt of persulphuric acid.

7. The process of claim 6, wherein the polymerisation initiator is selected from the group consisting of ammonium and potassium persulphate.

8. A process for preparing an aqueous emulsion of a vinyl acetate copolymer comprising the steps of providing an aqueous solution of a compound having the formula:

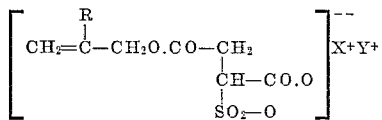

wherein R is selected from the group consisting of a hydrogen atom and a methyl radical, and of which X and Y are selected from the group consisting of hydrogen ions, alkali metal ions, ammonium radical ions, and substituted ammonium radical ions derived from organic amines, and adding to said solution a monomeric material selected from the group consisting of vinyl acetate and a mixture of vinyl acetate and at least one other ethylenically unsaturated monomer copolymerisable therewith so as to effect polymerisation of said monomeric material, the addition being made in a manner such that the concentration of monomeric material in the resulting dispersion is maintained at a low level throughout the polymerisation.

9. The process of claim 8, wherein the monomeric material is added in portions during the polymerisation reaction.

10. The process of claim 8, wherein the monomeric material is added continuously during the polymerisation reaction.

11. The process of claim 8, wherein said compound is the monoallyl ester of disodium sulphosuccinate.

12. The process of claim 8, wherein said compound is the monoallyl ester of diammonium sulphosuccinate.

13. A process for preparing an aqueous emulsion of a vinyl acetate polymer, comprising the step of polymerising a monomeric material selected from the group consisting of vinyl acetate and a mixture of vinyl acetate and at least one other ethylenically unsaturated monomer copolymerisable therewith in an aqueous dispersion in the presence of a surfactant and a colloid stabiliser both present in amounts insufficient to produce a stable emulsion, and in the presence of a compound having the formula:

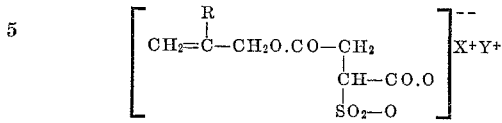

in which R is selected from the group consisting of a hydrogen atom and a methyl radical, and of which X and Y are selected from the group consisting of hydrogen ions, alkali metal ions, ammonium radical ions, and substituted ammonium radical ions derived from organic amines, said substance being present in a proportion between 0.02% and 5% of the total weight of the monomeric material present.

14. A process for preparing an aqueous emulsion of a vinyl acetate polymer comprising the step of polymerising a monomeric material consisting of vinyl acetate and up to 50% by weight of the total weight of the monomeric material of at least one other ethylenically unsaturated monomer copolymerisable with vinyl acetate and selected from the group consisting of the alkyl esters of maleic, fumaric, itaconic and acrylic acids, the vinyl esters of organic carboxylic acids having a molecular weight higher than acetic acid, the isopropenyl esters of organic carboxylic acids, vinyl chloride, vinylidene chloride, crotonic acid, itaconic acid and acrylic acid in an aqueous dispersion in the presence of a compound having the formula:

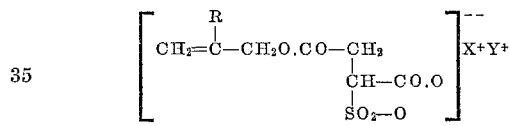

in which R is selected from the group consisting of a hydrogen atom and a methyl radical and in which X and Y are selected from the group consisting of hydrogen ions, alkali metal ions, ammonium radical ions and substituted ammonium radical ions derived from organic amines.

15. The process of claim 14, wherein said compound is present in the proportion between 0.2% and 5% of the total weight of the monomeric material present.

16. The process of claim 14, wherein the polymerisation is effected in the presence of a small amount of plasticizer for the resulting polymer.

17. The aqueous emulsion of a vinyl acetate polymer produced by the process of claim 1.

18. The aqueous emulsion of a vinyl actate copolymer produced by the process of claim 14.

References Cited by the Examiner

UNITED STATES PATENTS

| | | | |
|---|---|---|---|
| 2,386,445 | 10/1945 | De Groote et al. | 260—481 |
| 2,655,496 | 10/1953 | Adams | 260—85.5 |
| 2,859,191 | 11/1958 | Turnbull | 260—29.6 |

MURRAY TILLMAN, *Primary Examiner.*

D. ARNOLD, LEON J. BERCOVITZ, *Examiners.*